United States Patent [11] 3,604,681

[72] Inventor Joseph Verderber
  15255 Lake Shore Blvd., Cleveland, Ohio 44110
[21] Appl. No. 868,465
[22] Filed Oct. 22, 1969
[45] Patented Sept. 14, 1971

[54] SAFETY CATCH FOR AIR JIG VALVES AND THE LIKE
  8 Claims, 8 Drawing Figs.
[52] U.S. Cl. ................................................ 251/100, 137/381
[51] Int. Cl. ................................................ F16k 35/00, F16k 27/08
[50] Field of Search .......................... 251/100; 137/556, 559, 377, 381

[56] References Cited
UNITED STATES PATENTS

| | | | |
|---|---|---|---|
| 117,908 | 8/1871 | Meharg | 251/100 |
| 2,600,010 | 6/1952 | Luterick | 251/100 X |
| 2,945,703 | 7/1960 | Ballard | 251/100 X |
| 2,919,590 | 1/1960 | Griswold | 137/556 X |
| 3,346,006 | 10/1967 | Horton | 137/556 X |
| 3,451,423 | 6/1969 | Priese | 137/556 |
| 2,119,534 | 6/1938 | Gerber | 137/625.48 X |
| 2,542,390 | 2/1951 | Brown | 137/625.48 |
| 2,833,253 | 5/1958 | Wittren | 137/625.66 |

FOREIGN PATENTS

| 324,768 | 2/1930 | Great Britain | 251/100 |

Primary Examiner—Henry T. Klinksiek
Attorney—Isler and Ornstein

ABSTRACT: A safety catch is provided for air jig valves and the like, which is effective to latch or lock the air-control valve of an air jig or the like in either of two operative positions, to thereby prevent an operator or bystander from inadvertently or accidentally moving the valve from one of said positions to the other, or, at least, prevent the operator from moving the valve without first releasing the valve from its latched or locked condition. A cover is also provided for the safety catch to prevent dust and dirt from entering portions of the safety catch.

INVENTOR.
JOSEPH VERDERBER

INVENTOR.
JOSEPH VERDERBER
BY
*Isler & Ornstein*
ATTORNEYS

SAFETY CATCH FOR AIR JIG VALVES AND THE LIKE

This invention relates generally to jigs or clamping devices of the air-actuated type, but has reference more particularly to means for latching or locking the air-control valves of such devices against inadvertent or accidental movement.

In my U.S. Pat. No. 3,036,555, there is disclosed a quick-acting clamping device, which, in addition to utilizing a compressed fluid, such as air, as an actuating medium, also employs a pair of movable plungers as clamping members.

An air-control valve 18 is provided in that device, which, as described in the patent is movable between a position (FIG. 10) in which the compressed air causes the top plate P to clamp work to the pad 2, and a position (FIG. 8) in which the compressed air causes the top plate P to move upwardly, to thereby release or unclamp work which has been clamped to the pad 2 by the top plate P.

It is noted that the valve 18 is freely movable by a simple axial or reciprocal movement between its clamping and unclamping positions so that an operator or bystander, by inadvertently brushing against the handle of the valve 18, can accidentally move the valve from unclamping position, or through inadvertence, accidentally move the valve from clamping position. Such inadvertent or accidental movement of the valve could, manifestly, result in injury to the operator or bystander, or damage to the work in the device, or to the device itself, or both. It is further noted that the valve 18 is rotatable about its axis, without affecting its function, this being mentioned at this point for the reason that this rotation is utilized in connection with the invention to which this application is directed.

The has, as its primary object, the provision of a safety catch for a device of the character described, which is effective to latch or lock the air-control valve in either of its aforesaid positions, to thereby prevent an operator or bystander from inadvertently moving the valve from such positions, or, at least, prevent an operator from moving the valve, without first releasing the valve from such latched or locked condition.

Another object of the invention is to provide a safety catch of the character described, which is of simple, inexpensive construction, and which can be easily attached to existing clamping devices of the character described, and as easily detached or removed from the device, for repair or replacement.

A further object of the invention is to provide a cover for such safety catch, which is effective to prevent dust and dirt from entering portions of the safety catch.

Other objects and advantages of my invention will be apparent during the course of the following description.

In the accompanying drawings forming a part of this specification, and in which like numerals are employed to designate like parts throughout the same, FIG. 1 is a top plan view of a clamping device having the safety catch of the present invention embodied therein;

Figure 1:
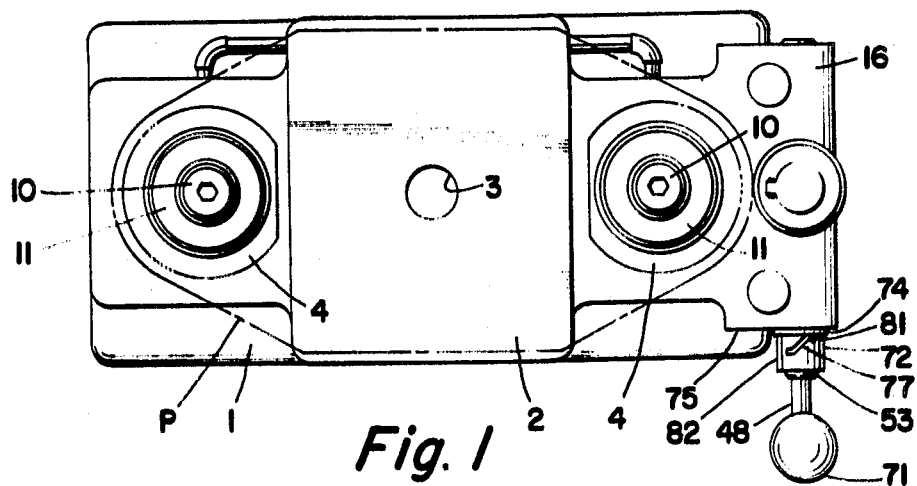
Figure 2:
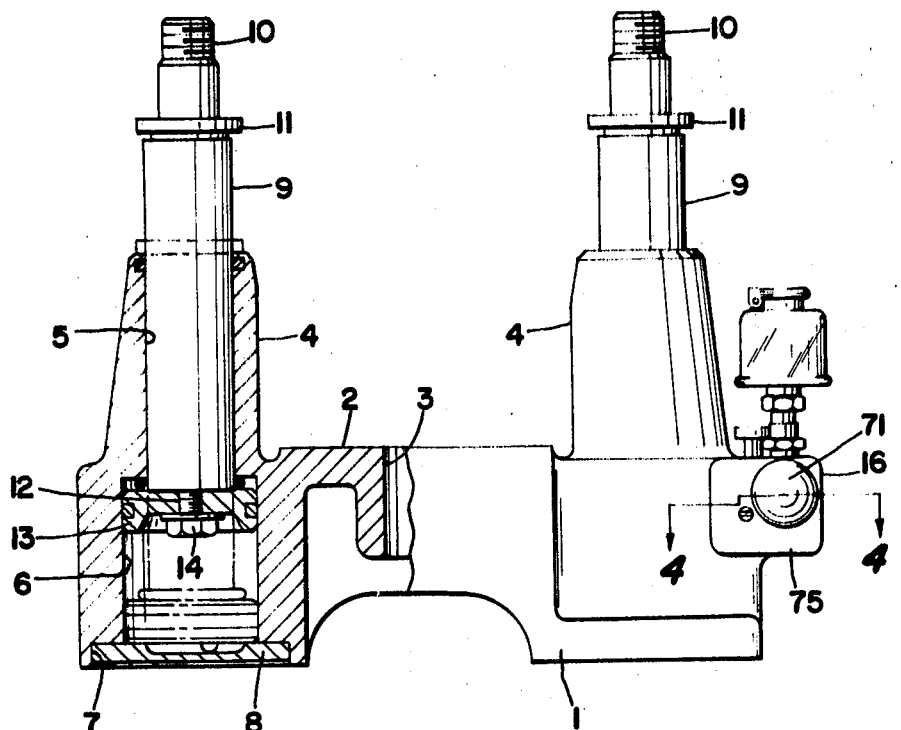
FIG. 2 is a front elevational view of the device, with portions thereof broken away to more clearly show the piston arrangement.
Figure 3:
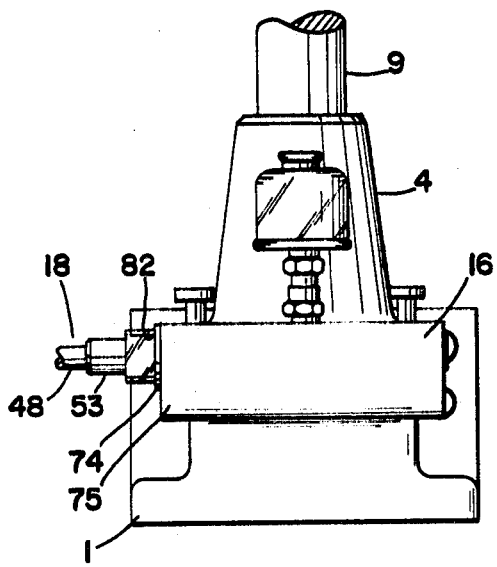
FIG. 3 is an end or side elevational view of the device, as viewed from the right side of FIG. 2.

Referring more particularly to FIGS. 1 to 5 inclusive, the clamping device is seen to comprise a rigid cast iron base 1 having a raised portion or pad 2 formed integrally therewith, which pad has a bored hole 3 extending vertically therethrough to locate the lower adapter in line with the top plate.

Projecting vertically upward from the base 1 and integral therewith are a pair of cylindrical standards 4, having a longitudinal bore 5 extending completely therethrough. The bore 5 is counterbored as at 6 to provide a cylinder, and the bore 6 is further counterbored, as at 7, for the reception of a cap 8, which closes the lower end of the cylinder 6, and is removably secured to the base 1.

Slidably mounted in bore 5 of each standard 4 is a plunger 9 having a threaded stud 10 projecting upwardly from its upper end. These plungers are adapted to support a clamping plate or top plate of suitable size and form. Such a top plate is indicated in FIG. 1 in broken lines, and is designated by the reference character P. The plungers 9 have flanges 11 on which the top plate P can rest and against which the plate can be secured by means of suitable nuts secured to the studs 10, as is well known to those skilled in this art.

Each of the plungers 9 is provided at its lower end with a threaded stud 12, to which a piston head 13 is secured, as by means of a nut 14. The heads 13 are movable in the cylinders 6, between the position shown in solid lines in FIG. 2, in which position the pad P is released or unclamped from the work on the pad 2, and the position shown in broken lines, in which the pad P clamps the work to the pad 2.

For the purpose of admitting air, under pressure, into the cylinders 6, for the purpose of actuating the piston heads 13, the base 1 is provided with an extension 16 which is provided with a multiplicity of passageways. These passageways include a horizontal bore or cylinder 17, in which a control valve generally designated by reference numeral 18, is mounted for slidable movement.

The function of this valve is described in detail in the aforesaid U.S. Pat. No. 3,036,555, and reference to that patent may be had for an understanding of its operation.

Figure 4:
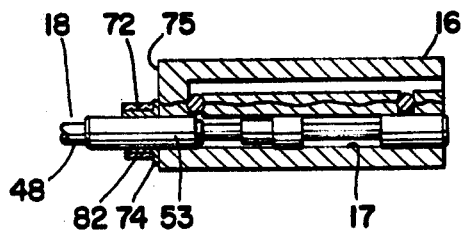
FIG. 4 is a fragmentary cross-sectional view, taken on the line 4—4 of FIG. 2, and showing the air-control valve in its unclamping position.
Figure 5:
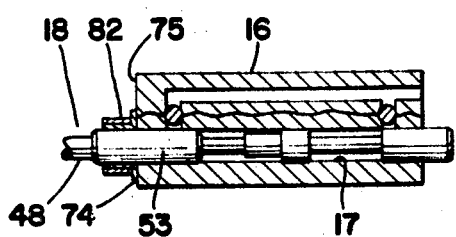
FIG. 5 is a view similar to FIG. 4, but showing the air-control valve in the clamping position.

For the purpose of the present invention, it need be noted only that the valve 18 is movable between the position shown in FIG. 4, in which the top plate P is caused to move to its unclamping position, to release work from the pad 2, and the position shown in FIG. 5, in which the top plate P is caused to move to its clamping position, for clamping work to the pad 2. It is to be further noted that the valve 18 has a bearing portion 53 which is slidable in the bore 17, a valve stem 48 extending from said bearing portion, and a handle 71 at the forward end of the stem 48, by means of which the valve 18 can be manually moved between the positions shown in FIGS. 4 and 5.

Figure 6:
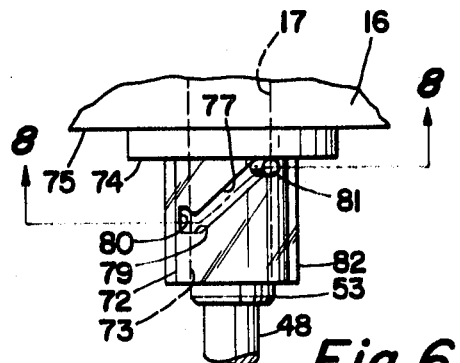
FIG. 6 is an enlarged fragmentary plan view, showing the safety catch.
Figure 7:
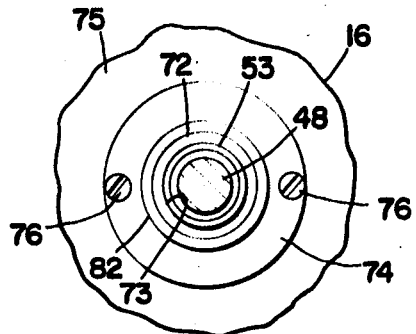
FIG. 7 is a front elevational view of the parts shown in FIG. 6.
Figure 8:
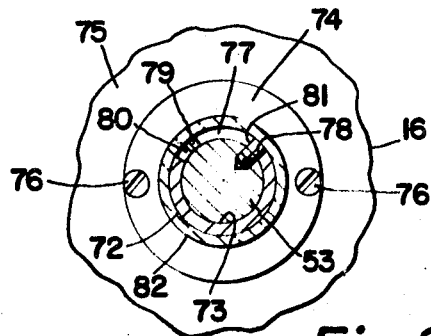
FIG. 8 is a cross-sectional view, taken on the line 8—8 of FIG. 6.

For the purpose of latching or locking the valve 18 in either of its aforesaid positions, a safety catch is provided, which is shown most clearly in FIGS. 6, 7 and 8.

The safety catch comprises a cylinder member 72 having a bore 73 which corresponds in diameter to the diameter of the portion 53 of the valve 18, and having a base flange 74 which is secured to the front face 75 of the extension 16 by means of screws 76, the safety catch being secured in such position that the portion 53 of the valve 18 is slidable as well as rotatable in the bore 73.

The cylindrical member 72 of the catch is provided in its upper portion with a slot 77, which extends through the member 72 and in a plane at an angle of approximately 45° to the axis of the member 72. The slot 77 terminates at one end in a short slot 78 which extends at an angle to the slot 77 and is disposed in a plane which is substantially parallel with the plane of the flange 74 and substantially perpendicular to the axis of the member 72.

The slot 77 terminated at its other end in a short slot 79 which is also disposed in a plane substantially parallel with the plane of the flange 74 and substantially perpendicular to the axis of the member 72. The slot 79 terminates at its outer end in a second short slot or recess 80 which extends toward the flange 74 and in a direction substantially parallel with the axis of the member 72.

The portion 53 of the valve 18 is provided with a pin 81, which, when the valve 18 is in the position shown in FIG. 4, is disposed in the slot or recess 78 of the safety catch, so that the valve 18 cannot be moved into the position shown in FIG. 5 until the pin is first moved laterally through the slot 78, then rearwardly through the slot 77 to the slot 79, then laterally into the slot 79, and then forwardly into the slot 80. During this movement, the valve 18 is being rotated about its axis through an arc of about 110°, this rotation being effected without, in any way, interfering with the function of the valve.

When the valve 18 is in the position shown in FIG. 5, the pin 81 is disposed in the slot 80 of the safety catch, so that the valve 18 cannot be moved to the position shown in FIG. 4 until the pin is first retracted from the slot or recess 80, then moved laterally through the slot 79, then forwardly through the slot 77 to the slot 78, and then laterally into the slot 78.

The safety catch thus provides a means for effectively latching or locking the valve in either of its two operative positions, thereby preventing an operator from inadvertently moving the valve from one of said positions to the other, or, at least, preventing the operator from moving the valve without first releasing the valve from such latched or locked condition.

For the purpose of preventing entry of dust and dirt onto the surface of the safety catch and into the slots and recesses therein, a cylindrical cover 82 is provided, which has a slip fit over the cylindrical member 72 of the safety catch, and may be secured, in any desired manner, to the safety catch. This cover 82 may be made of a clear or transparent plastic tubing, so that the position of the pin 81 of the valve 18 is clearly visible at all times.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a device of the character described having a cylindrical air-control-valve bore, an air-control valve slidably movable axially between two operative positions, said valve having axially spaced portions of reduced diameter forming annular space between said portions of reduced diameter and the cylindrical wall of said bore, said control valve being also rotatable about its axis and being provided with a pin extending radially therefrom, and having a control knob at its forward end, means for locking said valve in either of said operative positions, said means comprising a member secured to said device adjacent one end of said bore and having a cylindrical portion in which said valve is slidable and rotatable, said cylindrical portion having a slot into which said pin extends, said pin extending radially to but not beyond the outer wall of said cylindrical portion of said member, said slot disposed in a plane which is angular to the axis of said cylindrical portion, and is provided at its ends with slots or recesses disposed in planes substantially normal to the axis of said cylindrical portion, whereby said pin may be moved from said first-named slot into said last-named slots to thereby prevent axial movement of the valve without first moving said pin out of said last-named slots into said first-named slot.

2. A device, as defined in claim 1, wherein at least one of said last-named slots terminates in a recess which extends in a direction parallel with the axis of said cylindrical portion.

3. A device, as defined in claim 1, wherein said means is provided at one end with a flange adapted to be removably secured to a portion of said device.

4. A device, as defined in claim 1, wherein an open-ended cylindrical cover is provided for the cylindrical portion of said means to prevent ingress of dust and dirt into said slots, said cover covering the radially outermost end of said pin.

5. In a device of the character described having an air-control-valve bore, an air-control valve movable axially in said bore between two operative positions, said control valve being also rotatable about its axis, and being provided with a pin extending radially therefrom, means for locking said valve in either of said operative positions, said means comprising a member secured to said device and having a cylindrical portion in which said valve is slidable and rotatable, said cylindrical portion having a slot into which said bin extends, said slot disposed in a plane which is angular to the axis of said cylindrical portion, and is provided at this ends with slots or recesses disposed in planes substantially normal to the axis of said cylindrical portion, whereby said pin may be moved into said last-named slots to thereby prevent axial movement of the valve without first moving said pin out of said last-named slots, and a cylindrical cover of a transparent plastic for the cylindrical portion of said means, to prevent ingress of dust and dirt into said slots.

6. In a device of the character described having an air-control-valve bore, an air-control valve movable axially in said bore between two operative positions, said control valve being also rotatable about its axis, means for locking said valve in one of said positions against axial movement to the other position, means for locking said valve in the other of said positions against axial movement to said first-named position, and a transparent open-ended cylindrical cover enclosing both of said means for protecting said means against ingress of dust and dirt, while permitting visual inspection of said means.

7. A safety catch for air-control valves and the like, said catch comprising a cylindrical member having a slot extending therethrough and disposed in a plane which is angular to the axis of said cylindrical member, and is provided at its ends with slots or recesses disposed in planes substantially normal to the axis of said cylindrical member, and an open-ended cylindrical cover of a transparent plastic material encompassing said cylindrical member and preventing ingress of dust and dirt into said slots, while permitting visual inspection therethrough of said slots.

8. A safety catch, as defined in claim 7, wherein said cylindrical member is provided at one end with an annular flange.